United States Patent [19]

Nashan et al.

[11] Patent Number: 4,990,220
[45] Date of Patent: Feb. 5, 1991

[54] COKING REACTOR

[75] Inventors: Gerd Nashan, Oberhausen; Klaus Wessiepe, Essen; Heribert Bertling, Hattingen; Wolfgang Rohde, Essen; Manfred Blase, Essen; Manfred Galow, Essen; Ulrich Kochanski, Bochum; Heinz Dürselen, Essen; Johannes Janicka, Oberhausen; Dieter Stalherm, Recklinghausen; Joachim Holtz, Herten; Jürgen Tietze, Bochum; Ralf Schumacher, Hagen, all of Fed. Rep. of Germany

[73] Assignee: Bergwerksverband GmbH, Essen, Fed. Rep. of Germany

[21] Appl. No.: 399,527

[22] Filed: Aug. 22, 1989

[30] Foreign Application Priority Data

Dec. 22, 1986 [DE] Fed. Rep. of Germany ....... 3643916
Dec. 22, 1986 [DE] Fed. Rep. of Germany ....... 3643917
Dec. 22, 1986 [DE] Fed. Rep. of Germany ....... 3643918
Dec. 22, 1986 [DE] Fed. Rep. of Germany ....... 3643919

[51] Int. Cl.$^5$ ............................................. C10B 5/16
[52] U.S. Cl. ..................................... 202/139; 202/113; 202/142; 202/144; 202/151
[58] Field of Search ............... 202/113, 139, 140, 141, 202/142, 143, 144, 151

[56] References Cited

U.S. PATENT DOCUMENTS 1,193,066 8/1916 Roberts ............................... 202/140

Primary Examiner—Joye L. Woodard
Attorney, Agent, or Firm—Herbert Dubno

[57] ABSTRACT

Coking system, wherein the coking blends particularly based on hard coal, are fed batchwise to a reactor (1), which is heated indirectly by heat recovery in regenerators (I, II) or recuperators, whereby the reactor is built as a high-capacity coking reactor (100), several high-capacity coking reactors are combined to form a reactor block and the high-capacity coking reactors are built as mutually independent modules, whereby each module can be operated or optionally replaced independently of the neighboring modules, with little or no impairment of the operation of the neighboring modules. The individual reactors are independently operatable in terms of statics and heat supply. The regenerators, or recuperators (I, II, R, R') can be arranged laterally or underneath the reactor chamber. Neighboring reactors can have a common intermediate wall (2). The reactor chambers have a width of at least 0.7 m, a height of at least 8.5 m and a length of at least 18 m.

12 Claims, 8 Drawing Sheets

COKING REACTOR

FIELD OF THE INVENTION

The present invention relates to a coking reactor wherein the coking blends, preferably on a hard-coal basis are fed batchwise, whereby the reactor is heated through adjustable heating installations over the flue walls bordering the reactor chamber on both sides, indirectly with heat recovery in regenerators or recuperators. Moreover, the invention relates to an installation wherein several reactors are Joined to form reactor blocks.

THE RELATED ART

Current coke ovens for the carbonization of hard coal are of the battery-type construction, wherein chambers and flue walls alternate such that, one flue wall stands between two chambers.

The operation of a coke oven battery follows an established pushing and charging rhythm, e.g. the 5/2 sequence which means that the ovens numbered 1, 6, 11, 16, etc . . . . . 3, 8, 13, 18, etc . . . . 5, 10, 15, 10, etc . . . . 2, 7, 12, 17, etc . . . . . . 4, 9, 14, 19, etc. are pushed and filled again; another currently used sequence is the 2/1 sequence, where by analogy, the ovens 1, 3, 5, 7, etc . . . . . 2, 4, 6, 8, etc. are serviced in the above order. This is done deliberately in order to arrive at different carbonization conditions of neighboring oven charges; this way it is avoided that the swelling peak of one oven occurs at the very moment when the neighboring oven is pushed or its charge has already arrived at an advanced stage of carbonization and contraction, so that it does not form some kind of reinforcement against the swelling pressure in the adjacent oven. However, another consequence is that the heat supply can not be adjusted to the individual requirements of any oven charge. This is a disadvantage, since the heat requirement of a charge greatly diminishes towards the end of the cycle, so that it becomes possible to reduce the heat supply. With the known kind of construction and operation of coke oven batteries, it is necessary to put up with higher heat consumption.

On the other hand, the low stability of the flue walls forces the coke oven operators to scrupulously stick to a meticulous pushing sequence, in order to keep under control the operational hazards due to swelling oven charges. But nevertheless, the deformation or even destruction of coke-oven walls by strongly swelling coking blends are recurring phenomena in coking plants. Therefore, plant operators will watch very carefully that the proportion of swelling coal in a multicomponent blend does not become excessively high.

A further disadvantage of the conventional design of coke oven batteries consists in the presence of many sealing elements subjected to high thermal loads, so that they often become distorted and lose their sealing capabilities. Emissions from such defective sealing systems are the result.

A further disadvantage of this type of construction is that the battery can only be replaced in its entirety. Any replacement of battery components through advanced techniques will generally be impractical and unJustifiably expensive.

It is the object of the invention to propose a generic coking reactor avoiding wall damages due to excessive swelling pressures, bringing down the energy consumption and emissions, permitting the use of a wider range of coking blends, as well as an improved control and adjustment. Another object of the invention is to propose reactors which are independently operatable in terms of statics and heat supply, as well as installations wherein several reactors can be combined to form blocks amenable to advanced construction techniques and to simple methods of partial reconstruction.

SUMMARY OF THE INVENTION

As far as the aforementioned coking reactor is concerned, the problem is solved in that a/ the reactor is built as a high-capacity coking reactor with a reactor chamber (1), flue walls (3) and heating installations (10, 19, R, I, II), whereby the reactor chamber (1) has a width of at least 0.7 m and a useful height of at least 8.5 m, as well as a useful length of at least 18 m;

b/ the flue walls (3) bordering the reactor chamber (1) are arranged in a plane-parallel manner;

c/ the reactor chamber (1) with its flue walls (3) is arranged between at least two rigid lateral walls (2), whereby the flue walls (3) are rigidly braced against the lateral walls (2);

d/ each flue wall (3) has a stretcher wall (11) facing the reactor chamber (1) and a partition wall (12) facing the rigid lateral wall (2), as well as vertically running flues arranged therebetween; and e/ all installations (10, R, I, II) are assigned to the two flue walls (3) and to the flues separate control and/or adjustment elements (19) are assigned, for the independent heating of the reactor chamber (1).

In the coking reactor according to the invention high-capacity coking reactors are used, whereby a potential for rationalization is created which makes possible considerable increases in productivity (T of coke per pushing operation) and efficiency increases (T coke/$m^2$.h), without increasing investments. Since the design- and operation-induced forces are taken up by the rigid lateral walls, extraordinarily large reactor dimensions can be achieved.

Due to the enlargement of the reactor the expense for control and adjustment is :very low. Since there are less sealing surfaces in proportion to the production amounts, emissions are considerably reduced. Moreover, the number of pushing operations is lowered. The coking reactor of the invention accepts any coal types, including preheated coals, without problems. Damages due to swelling are excluded altogether, as the rigid lateral walls prevent the flue walls from being displaced. The drawbacks of the previous yielding system are precluded by a superior rigid system, withstanding substantially higher coking pressures. This allows coke production from a very wide range of coking or steam coals which are prone to swelling. With such rigid construction, the reactor roof merely serves for insulation, so that it may be of quite light-weight construction; unlike previously known yielding systems, the roof no longer needs to exercise any vertically supporting force upon the flue walls.

The plane-parallel configuration of the flue walls substantially simplifies the format of the bricks and, at the same time, reduces expenses related to brick laying. Unlike to the previous construction types, it is possible to supply the reactor chamber with consistent amounts of heat over its entire length. Known problems therefore no longer arise in the even distribution of the bottom-firing gas supply over the length of the chamber.

Surprisingly, with wider reactors the oven charge contracts sufficiently, and as a consequence, detaches itself well enough from the chamber walls, so that no problems whatsoever arise during pushing. The flue walls are moreover capable now of accepting frictional forces.

A further advantage of the plane-parallel construction is that now the heat supply may be set over the entire length of the chamber to a maximum brick temperature, which insures short coking cycles.

With the coking reactor of the invention, the reactor chamber is supplied with the correct amount of heat adjusted to the conditions of the charge, which reduces energy consumption. At the same time, the charge is carbonized evenly and completely everywhere, without undesirable local hot spots. Avoidance of excessive temperatures also keeps $NO_x$ formation in the waste gas within admissible limits.

The carbonization media for each heating flue are either preheated or cooled down in separate regenerator or recuperator units and the mass flows are individually controlled. This makes it possible to adjust the heat supply over the entire length of the chamber to the local requirements of its charge.

The high-capacity coking reactor of the invention preferably has a useful height of at least 8.5 m, a useful length of at least 18 m, as well as a useful width of minimum 0.7 m. This equals a useful reactor volume of 107m$^3$ and a coke production of 71 Tons. It was demonstrated by feasibility studies that a useful reactor height of 12 m, a useful reactor length of 25 m and a chamber width of 0.85 m are still practical, which could correspond to a useful reactor volume of 255m$^3$ and thus to a coke production of 165 Tons. The best useful volume of any of the known conventional coke ovens is max. 70 m$^3$, equalling 45 Tons of coke.

In an advantageous embodiment of the high-capacity reactor of the invention, the regenerators or recuperators are arranged between the flue walls and the rigid lateral walls. Due to this embodiment, a relatively low overall dimension is possible.

The rigid lateral walls are suitably rigidly connected to each other in the roof area. This is done advantageously by means of spacers and longitudinal anchors arranged between the rigid lateral walls. These spacers can, for instance, be roof elements.

The rigid lateral walls of the high-capacity reactor are advantageously provided with spring-tensioned rods, which are suitably cooled by forcibly feeding a cooling medium.

In the high-capacity reactor of the invention, the thickness of the stretcher wall may be reduced to 50 mm, since the static functions have been transferred to the rigid lateral walls, respectively have been taken over by them, while the flue walls of the reactor chamber merely have thermal functions, so that they have to be laid out only considering the thermal requirements and thus may be of relatively light construction. This improves heat transfer to the coal charge in the reactor chamber delimited by the flue walls. This way not only is the constructive design of a reactor with high-volume chamber simplified, but also its operation is substantially improved. The reduced thickness of the stretcher wall also brings further down the $NO_x$-formation, since lower temperatures can be used, without extending the coking cycle.

The rigid lateral walls taking up the construction- and operation-induced forces of the high-capacity coking reactor are preferably form-lockingly connected to a base plate. This insures that the bottom line of the rigid lateral walls is well fixed.

For the transfer of forces from the chamber to the rigid lateral walls of the high-capacity coking chamber, block walls extend into cross walls, the regenerators or recuperators being arranged between the latter, longitudinally to the chamber axis.

In accordance with a further development of the invention, two regenerators of counterflow type may be arranged between the rigid lateral walls and the flue walls of a high-capacity coking reactor, in this case the regenerators being separated by a wall extending longitudinally to the chamber axis, and communicating with one another via an upper or lower reversing point.

Instead of one regenerator facing the rigid lateral wall of the high-capacity coking reactor, rather a vertical duct without any heat-exchanging material may be provided, this in order to further reduce the thermal load on the rigid lateral wall.

In order to reduce the reactor width, it is possible to make the insulating layer between regenerator and flue wall of the high-capacity reactor thicker or less heat-conductive in the (upper) cold regenerator portion than in the (lower) hot portion, whereas the insulation between the duct and the regenerator may be thicker or less heat-conductive in its (lower) hot portion than in the (upper) cold portion.

The constructive and technical expenditure required for the reconstruction of a high-capacity coking reactor may be even further reduced, when the reactor and/or its components, and/or the rigid lateral walls and/or their components are made of large prefabricated high-volume parts, preferably of refractory concrete. The rigid lateral walls, cast preferably of concrete, e.g. refractory concrete, can have cooled armatures, e.g. spring-tensioned rods, in order to counteract the negative effects of high temperatures and of periodical temperature variations.

The heating flues of the flue walls may be built either as twin flues, quadruple flues, or two-part heating systems whereby the separate and independently operatable regenerators for air, poor gas and waste heat are associated to each of the two flue walls of a reactor chamber. This insures a completely independent heat supply to the oven charge from either of the chamber walls.

In individual cases, it can be advantageous when the heat-recuperating part of a high-capacity coking reactor is located in the form of regenerators or recuperators below the flue walls and/or the reactor chamber. As a result, the reactor has a smaller base surface.

According to a further advantageous embodiment of the invention, installations are proposed wherein several high-capacity coking reactors are combined into a reactor block. These high-capacity coking reactors are built as modules and are operatable, optionally replaceable independently from the neighboring modules. The individual high-capacity coking reactors are identical construction units (modules) consisting basically of a reactor chamber, flue walls, heat-recuperating part and reactor roof, which in their entire or their parts can be replaced and, if necessary, repaired without interrupting the production of the reactor block.

The operation of such a reactor block is flexible enough to permit adjustment to any changes in the market conditions as each module/submodule represents a unit which is independent of the rest of the modules/submodules, both from the thermal and constructional points of view. Combining them into blocks means also maintaining the advantages of the previous battery set-up, as far as servicing is concerned.

The suggested concept is therefore completely new and allows the construction of high-capacity coking reactors with useful dimensions beyond current heights, lengths and widths of coking chambers. Since the heat supply to each of the flue walls is independent, the different high-capacity coking reactors forming one block may, for instance, be operated separately via program control; this has not been possible so far, since with the current battery arrangement, neighboring coke ovens are linked in terms of constructional design and heat supply.

Another positive feature of the block design is that only one rigid lateral wall each is arranged between two neighboring high-capacity coking reactors.

As an alternative to the individual tie-rod arrangement suggested to connect two rigid lateral walls, it is also possible to use longitudinal tie rods which preferably extend over the entire length of the reactor-block roof. In connection with the different spacers, this will facilitate the longitudinal stabilization of the reactor block.

Thus, the present invention suggests a reactor block combining large chamber volumes, simple structure, easy access for repairs as well as economic, programable and independent operation of the different high-capacity coking reactors involved.

One or several oblong orifices may be arranged in the reactor roof. These orifices may serve both for charging as well as for levelling the charge. Another desirable alternative is to employ secondary charging systems, e.g. telescoping tubes which can be lowered into the reactor chamber.

BRIEF DESCRIPTION OF THE DRAWING

The drawing will facilitate the following more detailed description of the invention, wherein.

DETAILED DESCRIPTION

Figure 1:
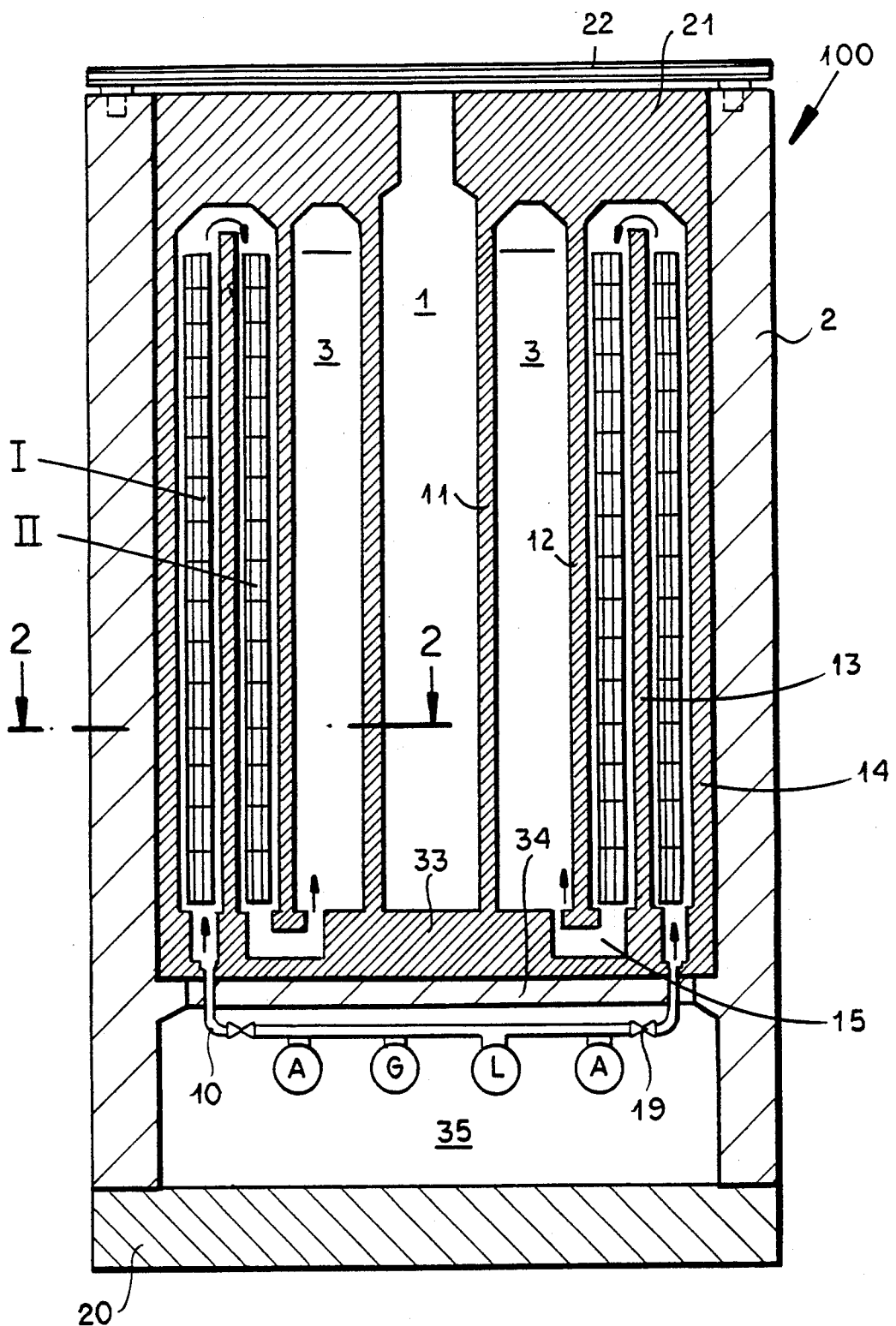
FIG. 1 : is a vertical section through a high-capacity coking reactor wherein the regenerators are arranged between flue walls and rigid lateral walls.
Figure 2:
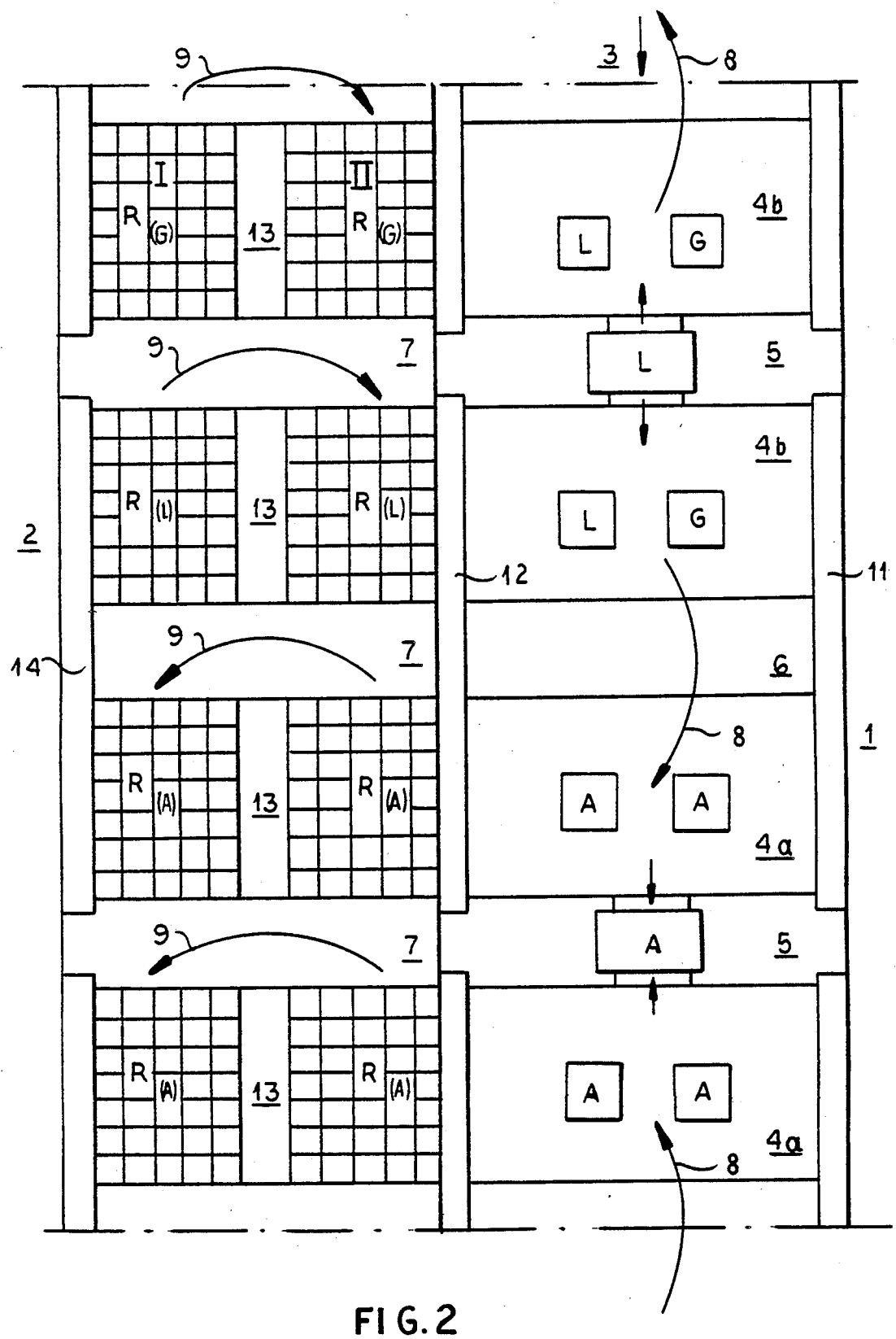
FIG. 2 : is a partial horizontal section along line 2-2 of FIG. 1.

FIG. 1 represents a vertical section through a high-capacity coking reactor 100. It consists of reactor chamber 1, flue chamber 3 with stretcher wall 11 and partition wall 12, regenerators I and II with a respective longitudinal partition wall 13, insulating layer wall 14, reactor roof 21 and reactor sole 33, all of which are arranged between two rigid walls 2 which are interconnected at the bottom via a base plate 20 and at the top via spacers 22. The reactor chamber 1 is equipped in the usual way with detachable reactor doors (not shown), at its frontal and rear end. Underneath the reactor sole 33, a spacer 34 forming the upper confinement of a reactor basement 35, is arranged. The reactor basement 35 houses the supply- and return ducts 10 for the flow of combustion media air L, gas G and waste heat A to and from the regenerators I, II. The regenerators communicate with heat return flues 4a and heat supply flues 4b (FIG. 2). The flow through each duct 10 is controllable or adjustable via valves 19. However, a means is provided for controlling or adjusting several supply-and return ducts together.

Figure 6:
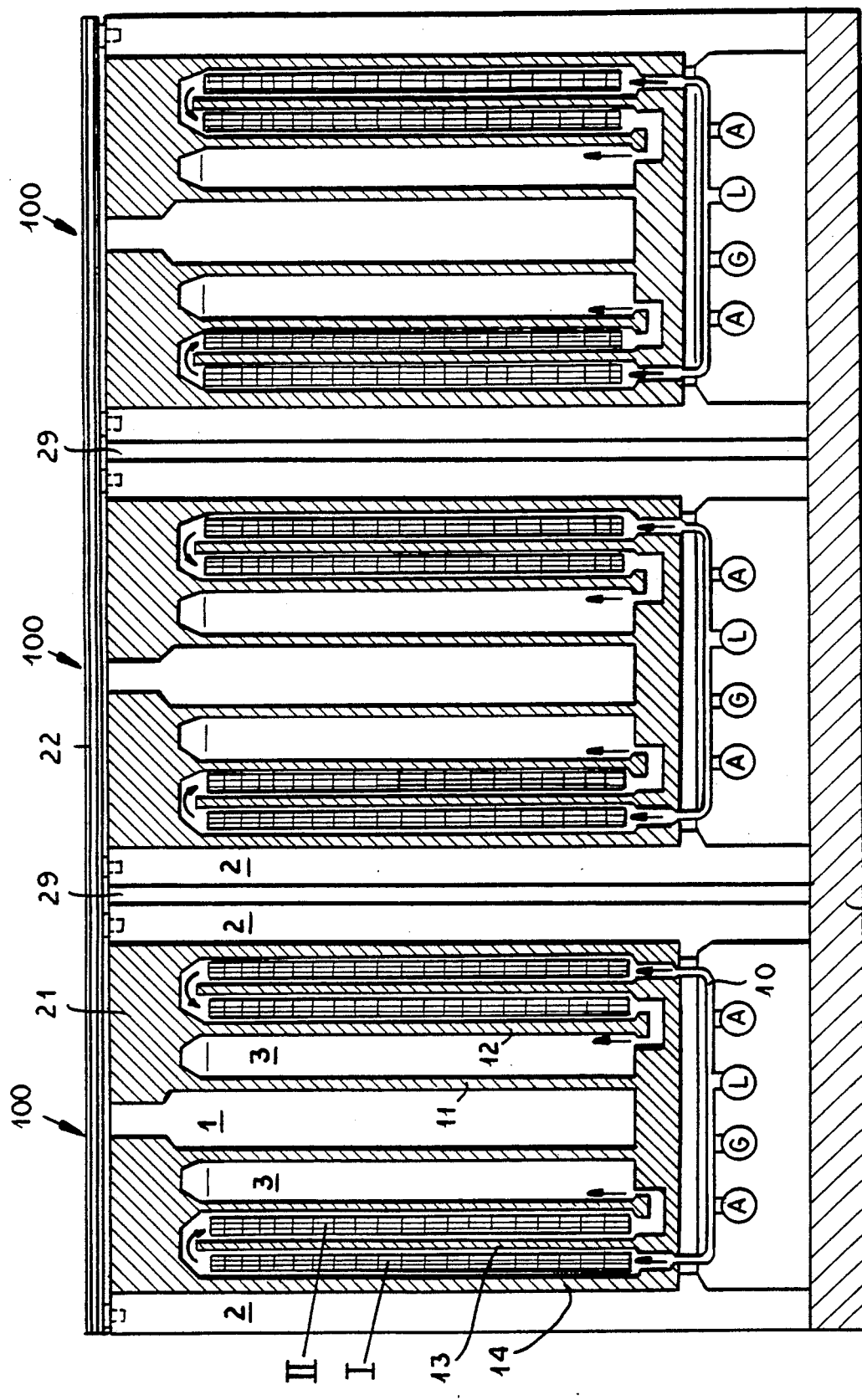
FIG. 6 : represents the vertical section of a reactor block formed by individual high-capacity coking reactors with regenerators arranged between flue walls and rigid lateral walls.
Figure 7:
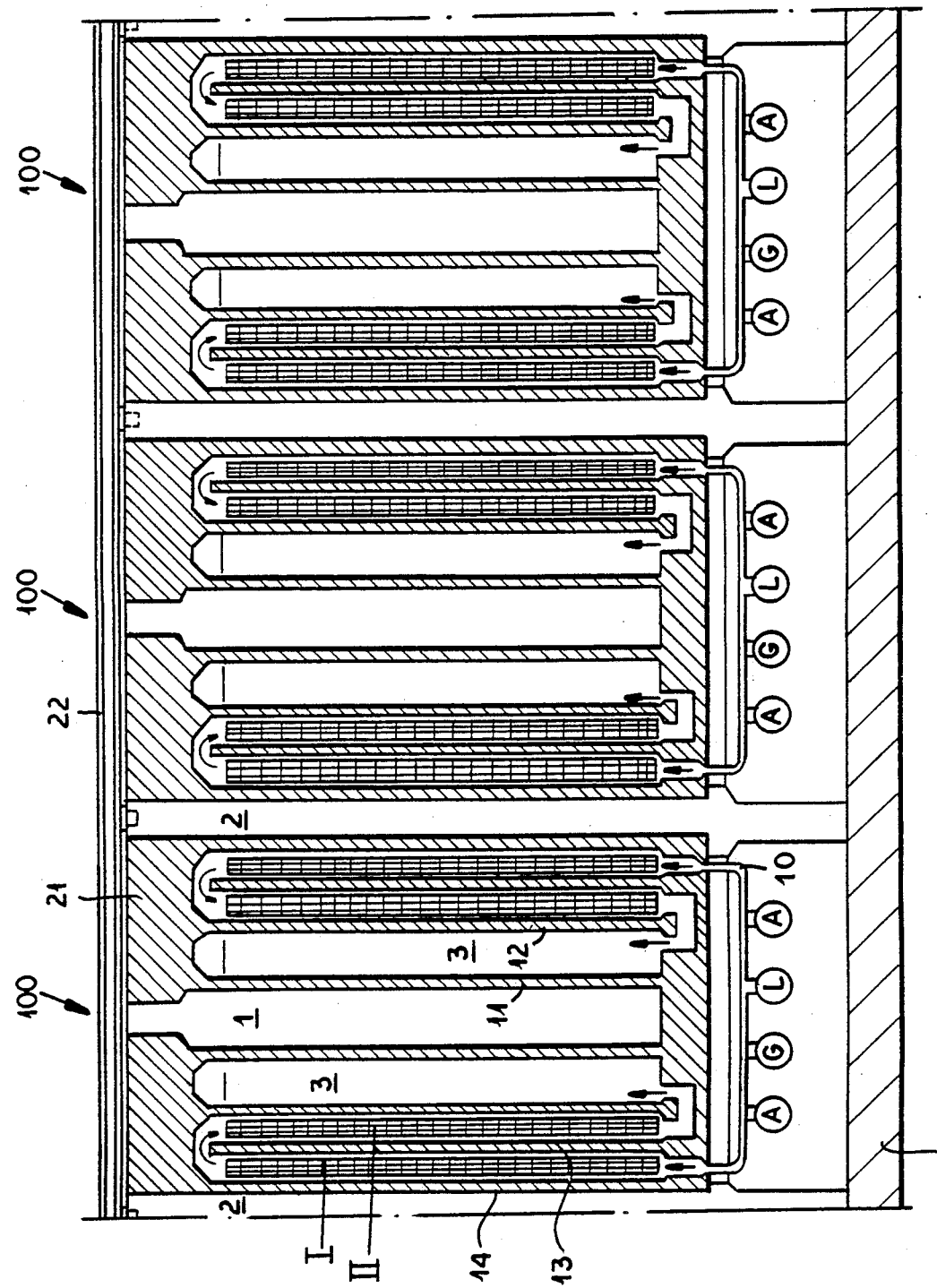
FIG. 7 : is a reactor block formed by individual high-capacity coking reactors, similar to FIG. 6, but with only one rigid lateral wall each arranged between two neighboring high-capacity coking reactors.
Figure 8:
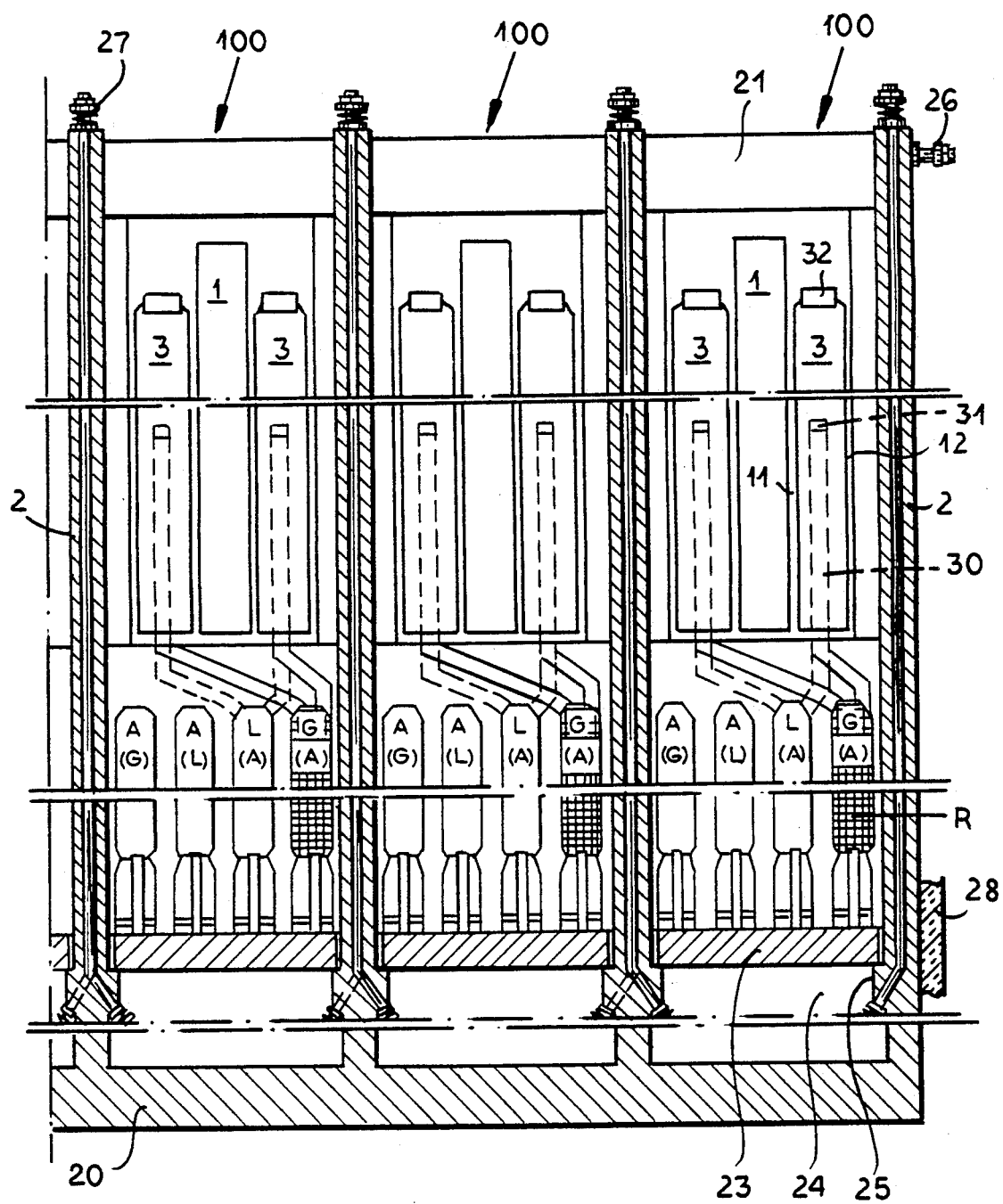
FIG. 8 : shows a reactor block similar to FIG. 6, but with the regenerators arranged underneath the flue walls.

Any and all elements needed to supply heat to the reactor chamber 1 are thus arranged between the rigid lateral walls 2 so that each reactor chamber 1 is operatable independently of the neighboring units in cases where several high-capacity coking reactors 100 are combined to form a block (FIGS. 6, 7, 8). FIG. 1 shows the flow direction of air L or poor gas G through the supply ducts 10 through regenerators I and II and reversing point 15 towards the bottom end of a heat supply flue 4b (FIG. 2). The abduction flow of waste heat A (not shown in FIG. 1) from a return flue 4a (FIG. 2) passes in the reverse direction via reversing point 15 and regenerators I and II towards the return ducts 10 for waste heat A.

FIG. 2 represents part of the left half of the high-capacity coking reactor 100, as per FIG. 1, in a horizontal section. The illustration explains above all the cross connections starting with stretcher wall 11, via hollow block wall 5 or solid block wall 6, partition wall 12, cross wall 7 and wall 14 with insulating layer up to the rigid lateral wall 2.

Further in FIG. 2, in the hollow block walls 5, hollow block ducts 30 having vertically graded discharge slots 31 for the supply of heated air L and poor gas G to the heat supply flues 4b and the abduction of waste heat A from the heat return flues 4a are represented by the respective media symbol L, G and A. The hollow block ducts 30 and discharge slots 31 are more clearly illustrated in FIG. 5. Arrows 8 indicate the flow reversal in the direction of the longitudinal chamber axis, starting from the supply gas flues 4b through the return flues 4a. Reversal of the flow direction at the upper reversing point 15 from the supplyside to the return side regenerator (R) has been illustrated by arrows 9.

Figure 3:
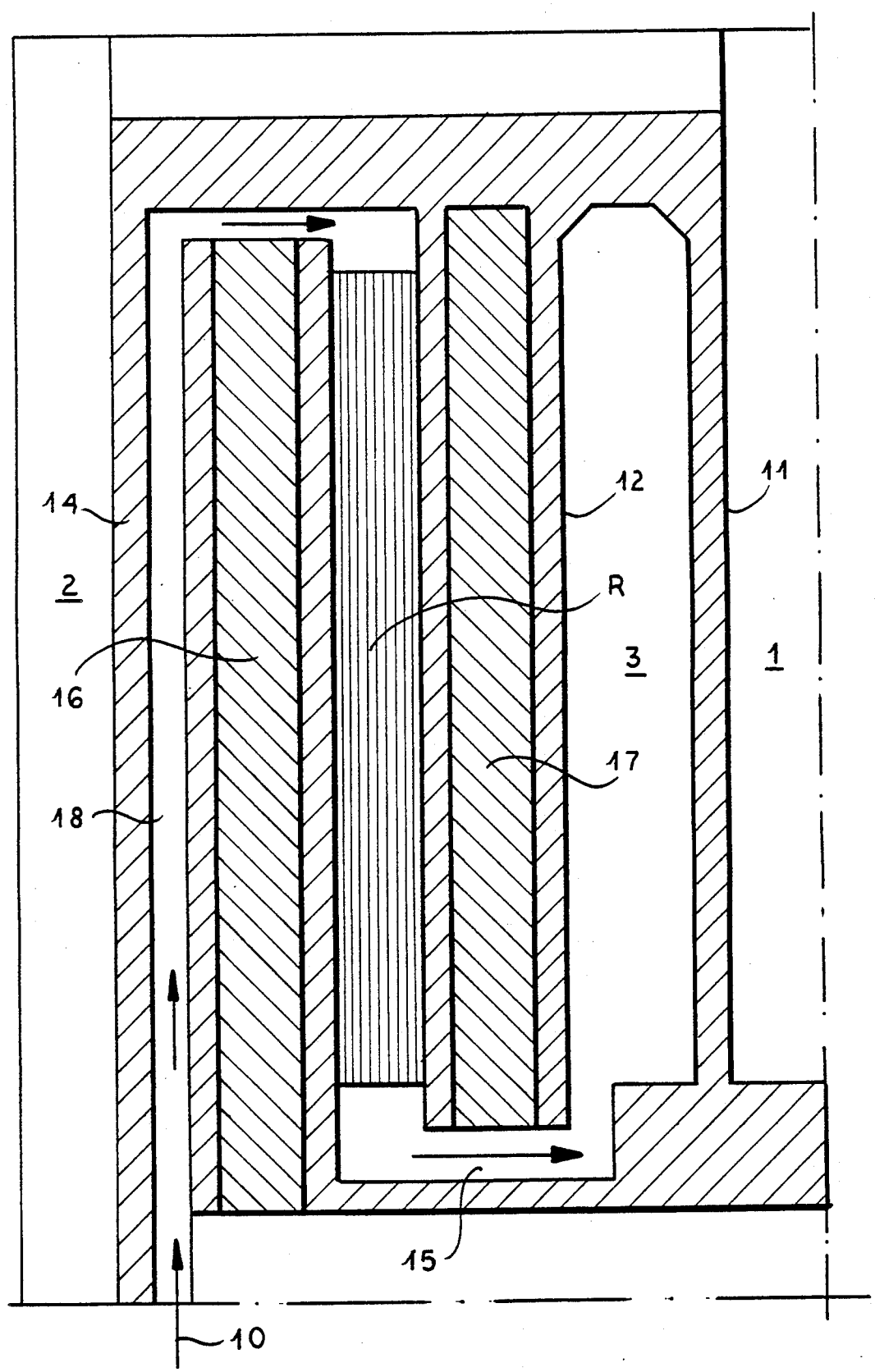
FIG. 3 : shows the relevant vertical section of another configuration of the object represented in FIG. 1, with a vertical duct arranged near the rigid lateral wall.

FIG. 3 represents an embodiment of a single-duct regenerator (R) or recuperator where the combustion media are supplied or abducted via vertical duct 18 arranged between the rigid lateral wall 2 and an insulating layer wall 16, and further via regenerator (R and reversing point 15. The insulating layer walls 16 and 17 can extend over the vertical height of the reactor chamber 1 and can be made of materials with various thermal conductivity.

Figure 4:
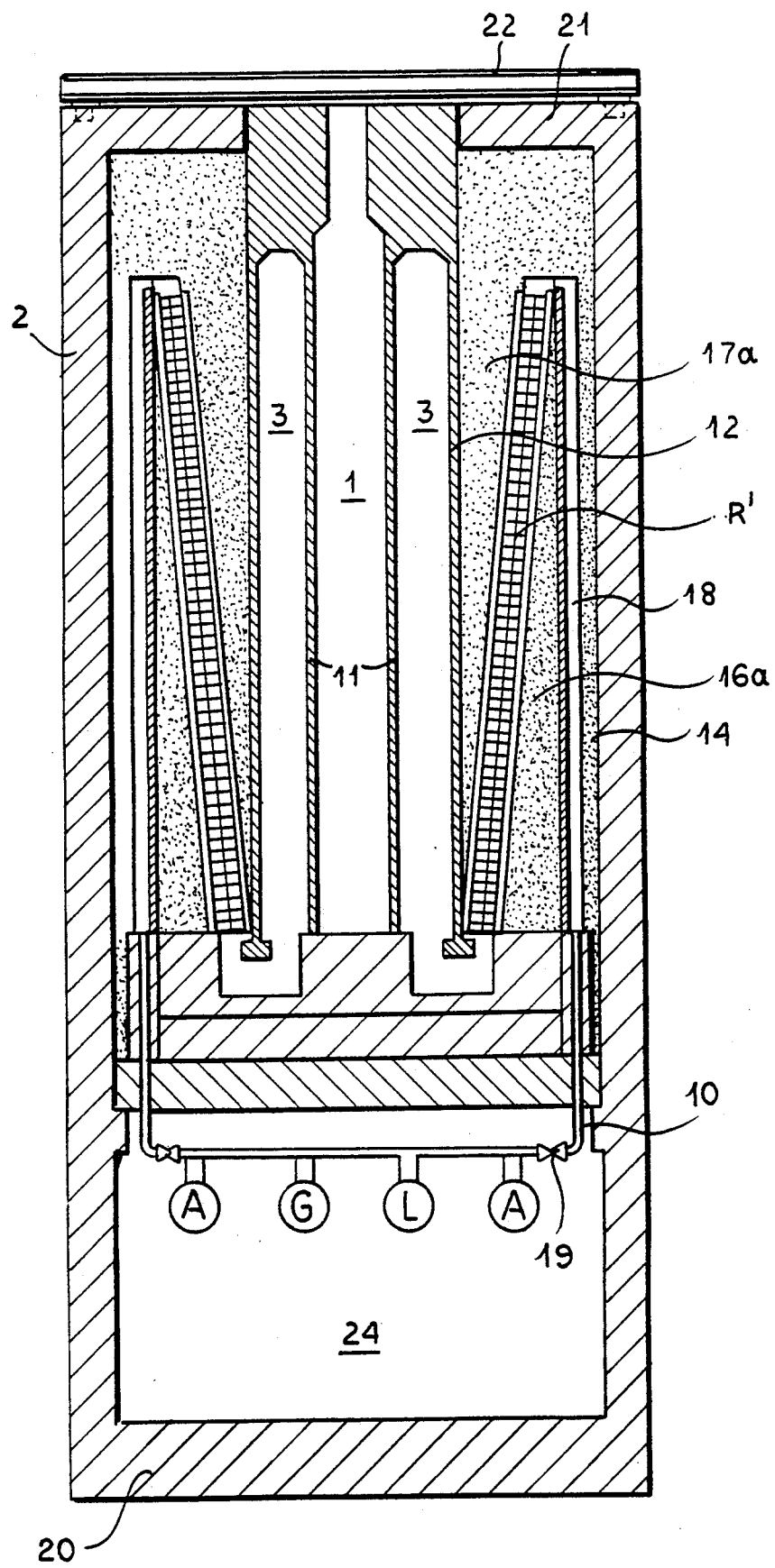
FIG. 4 : represents an improvement of the object according to FIG. 3, i.e. with varying thickness of the insulating layers.

FIG. 4 shows an embodiment wherein the insulating layer wall 16a extending along the lower portion of the regenerators (R') is thicker than the insulating layer wall 17a, and vice versa in the upper portion of the regenerator (R'). This results in the inclined position of regenerator (R') as shown. With this configuration, the elements arranged between the lateral walls 2 are such as to allow simple replacement.

Figure 5:
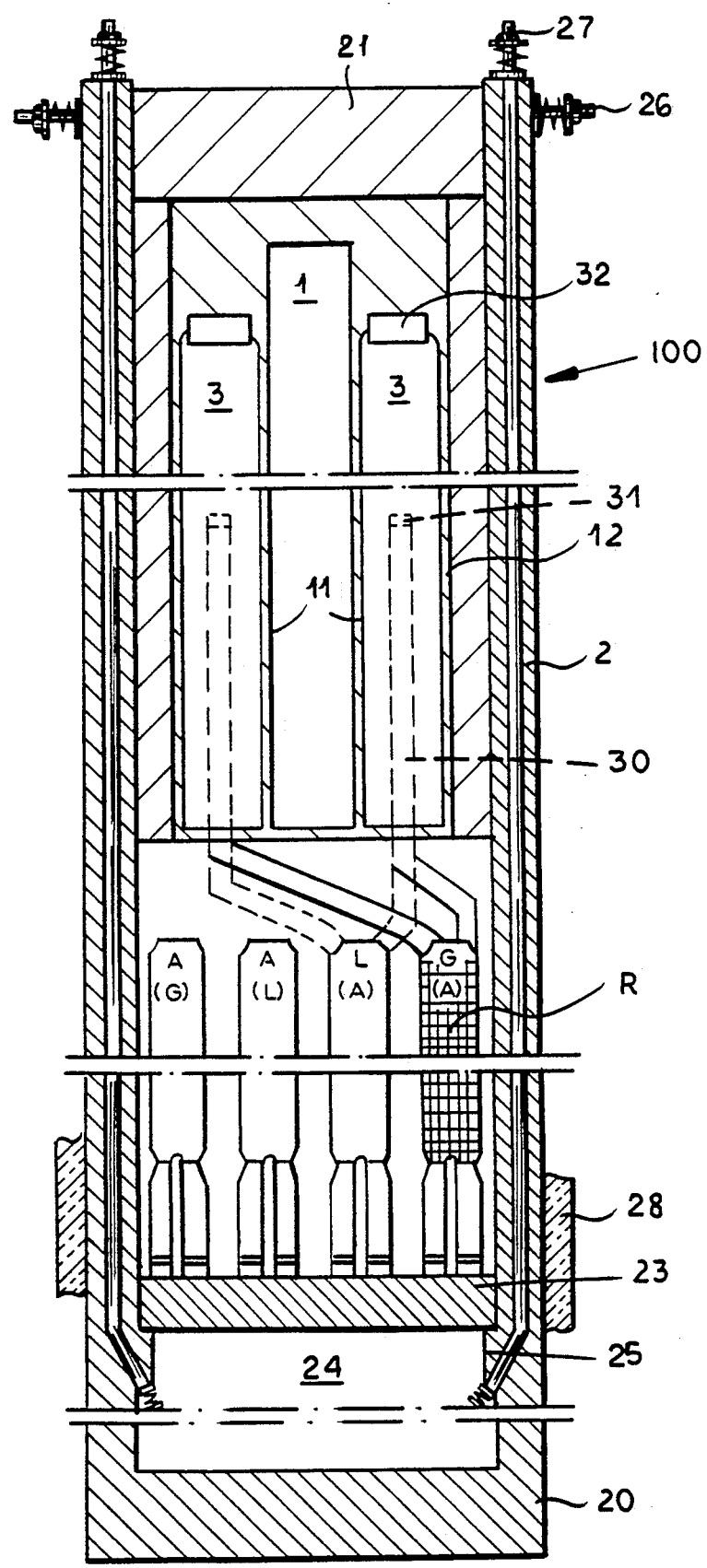
FIG. 5 : is a vertical section of a high-capacity coking reactor wherein the regenerators are arranged underneath the flue walls and the reactor chamber.

FIG. 5 illustrates a high-capacity coking reactor 100, with the regenerator (R) arranged underneath the reactor 1. With this configuration, the rigid lateral walls 2 are interconnected both by spring-tensioned longitudinal rods 26 arranged horizontally in the reactor roof 21 as well as by the base plate 20. Thanks to this construction, the selected spacing of the rigid lateral wall 2 is maintained even when individual elements are removed. The rigid lateral walls are additionally equipped with vertical, cooled tensioning rods 27.

The regenerator (R) arranged underneath is supported by one or several intermediate platforms 23, above a basement 24; the intermediate platforms are, in turn, supported by projections 25 from the lateral walls 2.

For the high-capacity coking reactor 100 as shown, the flue chamber 3, regenerator (R) and reactor roof 21, but exclusive of the intermediate platform 23, can be entirely made of a brickwork structure. Individual elements, such as roof or wall elements or the regenerator (R) can be made alternatively, either entirely or partially of prefabricated refractory concrete components, separately replaceable to a large extent, in order to simplify and accelerate repairs. The faces of the stretcher walls 11 defining the reactor chamber 1 extend parallel to each other and along the longitudinal axis of the chamber.

An exterior insulating layer 28 may be provided to avoid excessive temperature gradients in the rigid lateral walls 2. The combustion media are supplied to the flue chamber 3 from the regenerators (R) via hollow block ducts 30 and vertically graded discharge slots, of which only the uppermost 31 has been illustrated. The combustion gases are evacuated via an upper reversing point 32 and then in the reverse direction via the heating flues and hollow block ducts 30 towards the regenerators (R).

In FIG. 6, three high-capacity reactors 100 of the type shown in FIG. 1, have been joined to form a reactor block. One cooling gap 29 each is provided between two neighboring lateral walls 2. Since the high-capacity coking reactors are operatable independently, one reactor block may consist of any number of reactors.

FIG. 7 shows a reactor block configuration wherein between two neighboring high-capacity coking reactors 100 of the kind represented in FIG. 1, each time only one rigid lateral wall 2 is provided.

In FIG. 8, several high-capacity coking reactors 100 with regenerators (R) located under the flue chambers 3 and the reactor chamber 1 (according to FIG. 5) are joined to form a reactor block.

Thereby, like in FIG. 7, between two neighboring high-capacity coking reactors 100, each time only one rigid lateral wall 2 is provided, which is equipped in vertical direction with cooled tensioning rods 27. The outer rigid lateral wall 2 at the end of the reactor block is provided with an insulating layer 28.

We claim:

1. A coking reactor supplied batchwise with coking blends comprising:
   a reactor chamber having a width of at least 0.7 m, a useful height of at least 8.5 m and a useful length of at least 18 m;
   a flue chamber adjacently positioned plane parallel on either side of said reactor chamber, each of said flue chambers comprising:
     a stretcher wall adjacent said reactor chamber; and
     a partition wall facing opposite and outward from stretcher wall;
     one pair of rigid lateral walls encompassing therebetween said flue chambers and said reactor chamber;
   an adjustable heating means for supplying hot heating media and heating said reactor chamber indirectly through said flue chambers;
   a plurality of regenerator means for recovering heat from the hot heating media; and
   separate control means for regulating said adjustable heating means and allowing each of said flue chambers to be independently heated.

2. A coking reactor according to claim 1 wherein one of said regenerator means is positioned between one of said partition walls and one of said rigid lateral walls.

3. A coking reactor according to claim 1 further comprising a roof area above said reactor chamber, said rigid lateral walls being interconnected in said roof area in a rigid manner through spacing elements and longitudinal tie rods.

4. A coking reactor according to claim 1 wherein said rigid lateral walls are provided with cooled tensioned rods.

5. A coking reactor according to claim 1 wherein said stretcher walls have a thickness of at least 50 mm.

6. A coking reactor according to claim 1 further comprising a base plate below said reactor chamber through which said rigid lateral walls are positively connected.

7. A coking reactor according to claim 1 further comprising cross walls and block walls, said cross walls and block walls being connected with one another and having arranged therebetween said regenerator means in a longitudinal direction of said reactor chamber, said cross and block walls being oriented transverse to said rigid lateral walls and allowing transmission of forces from said reactor chamber to said rigid lateral walls.

8. A coking reactor according to claim 1 wherein said plurality of regenerator means comprises two regenerator means positioned between one of said rigid lateral walls and one of said partition walls, said reactor chamber further comprising a longitudinal wall between said one partition and one rigid lateral wall and running in a longitudinal direction of said chamber, said two regenerator means being separated from one another by said longitudinal wall, and said two regenerator means being in communication with one another through a reversing point defined by an end of the longitudinal wall for counterflow of the hot heating media therethrough.

9. A coking reactor according to claim 1 further comprising a vertical duct formed between one of said rigid lateral walls and one of said partition walls, said vertical duct being free of heat-exchanging material and there being only one regenerator means between said rigid lateral and partition walls.

10. A coking reactor according to claim 9 further comprising an insulating layer wall between said regenerator means and said partition wall and a further insulating layer wall between said vertical duct and said regenerator means, said insulating layer wall being thicker in an upper cool area of said regenerator means than in a lower area thereof, and said further insulating layer wall being thicker in said lower area of said regenerator means and thinner in said upper area.

11. A coking reactor according to claim 1 wherein at least one of said regenerator means is arranged underneath said flue chamber.

12. A coking reactor according to claim 1 wherein a plurality of said coking reactors are joined together to form a reactor block, each of said coking reactors forming an individual module, each of said modules being operatable and optionally replaceable independently of any neighboring modules.

* * * * *